United States Patent
Ueda et al.

(10) Patent No.: US 11,283,998 B2
(45) Date of Patent: Mar. 22, 2022

(54) PORTABLE IMAGE PICKUP APPARATUS WITH CARABINER STRUCTURE

(71) Applicant: CANON KABUSHIKI KAISHA, Tokyo (JP)

(72) Inventors: Haruhisa Ueda, Kanagawa (JP); Nobuyuki Furukawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/148,931

(22) Filed: Jan. 14, 2021

(65) Prior Publication Data
US 2021/0227138 A1 Jul. 22, 2021

(30) Foreign Application Priority Data
Jan. 21, 2020 (JP) .............................. JP2020-007682

(51) Int. Cl.
*H04N 5/225* (2006.01)
*H04N 5/232* (2006.01)

(52) U.S. Cl.
CPC ....... *H04N 5/23248* (2013.01); *H04N 5/2252* (2013.01); *H04N 5/2254* (2013.01); *H04N 5/23245* (2013.01)

(58) Field of Classification Search
CPC .................................................. H04N 5/23248
See application file for complete search history.

(56) References Cited

U.S. PATENT DOCUMENTS

| | | | | |
|---|---|---|---|---|
| 2004/0051807 A1* | 3/2004 | Niwa | ................. | H04N 5/23245 348/372 |
| 2005/0200738 A1* | 9/2005 | Song | ................. | H04N 1/00387 348/333.02 |
| 2007/0013674 A1* | 1/2007 | Woolley | .............. | G06F 3/04886 345/173 |

(Continued)

FOREIGN PATENT DOCUMENTS

JP 2009147443 A 7/2009

OTHER PUBLICATIONS

John Aldred, "Canon Hopes to Succeed Where Nikon's Keymission Failed" (see video at https://www.diyphotography.net/canon-hopes-to-succeed-where-nikons-keymission-failed/), Mar. 11, 2019, all pages (Year: 2019).*

(Continued)

*Primary Examiner* — Gary C Vieaux
(74) *Attorney, Agent, or Firm* — Rossi, Kimms & McDowell LLP

(57) ABSTRACT

An image pickup apparatus that does not disturb an image pickup operation irrespective of an image pickup posture and is capable of reducing generation of image blur. The image pickup apparatus including a main body, a frame part, and at least one operating member. The main body has an image pickup lens. The frame part forms an opening together with a part of the main body and has an opening/closing member that opens/closes the opening. The operating member is used to enter a predetermined pickup instruction and is arranged in at least one of a first surface at an object side and a second surface opposite to the first surface that are parallel to an opening plane of the opening in the main body.

14 Claims, 15 Drawing Sheets

(56) References Cited

U.S. PATENT DOCUMENTS

| | | | | |
|---|---|---|---|---|
| 2009/0102414 A1* | 4/2009 | Fowler | ................ | H02J 7/35 |
| | | | | 320/101 |
| 2009/0231445 A1* | 9/2009 | Kanehiro | ........... | H04N 5/35581 |
| | | | | 348/208.2 |
| 2011/0135272 A1* | 6/2011 | Ichii | ................ | H04N 5/2252 |
| | | | | 386/225 |
| 2019/0387143 A1* | 12/2019 | Shibata | ............... | A45C 11/38 |

OTHER PUBLICATIONS

Indiegogo, https://www.indiegogo.com/projects/canon-ivy-rec-clippable-outdoor-camera-sold-out#/, Aug. 26, 2021, all pages (Year: 2019).*

Wayback Machine—Web Archieve, http://web.archive.org/web/20190715103918/https://www.indiegogo.com/projects/canon-ivy-rec-clippable-outdoor-camera-sold-out#/, Jul. 15, 2019, all pages (Year: 2021).*

Paul Ridden, "Canon releases tiny outdoor camera built into a carabiner", Oct. 10, 2019, all pages (Year: 2019).*

Jakub Han, "Canon Outdoor Activity Camera Concept Explained", Mar. 11, 2019, all pages (Year: 2019).*

Wayback Machine—Web Archieve, https://www.nikonusa.com/en/nikon-products/product-archive/action-camera/keymission-80.html, dated Oct. 26, 2020, all pages (Year: 2020).*

\* cited by examiner

PORTABLE IMAGE PICKUP APPARATUS WITH CARABINER STRUCTURE

BACKGROUND OF THE INVENTION

Field of the Invention

The present invention relates to an image pickup apparatus like a digital camera, and in particular relates to an image pickup apparatus having improved portability.

Description of the Related Art

There is a known digital camera of which a camera body is provided with a carabiner part so as to improve portability by increasing wearability (see Japanese Laid-Open Patent Publication (Kokai) No. 2009-147443 (JP 2009-147443A)).

However, in the technique described in the above-mentioned publication, the carabiner part is formed as a member separate from a housing of the digital camera and is connected to a cord that has flexibility so that the cord can be rolled up by a cord reel. Accordingly, when a user holds the digital camera in a state where the cord is not pulling out from the cord reel, the holding of the camera is difficult because the user covers the carabiner part by a hand, which may disturb an image pickup operation. Moreover, expansion and contraction of the cord causes a camera shake (image blur) at a time of an image pickup operation.

SUMMARY OF THE INVENTION

The present invention provides an image pickup apparatus that does not disturb an image pickup operation irrespective of an image pickup posture and is capable of reducing generation of image blur.

Accordingly, a first aspect of the present invention provides an image pickup apparatus including a main body configured to have an image pickup lens, a frame part configured to form an opening together with a part of the main body and to have an opening/closing member that opens/closes the opening, and at least one operating member configured to enter a predetermined pickup instruction and to be arranged in at least one of a first surface at an object side and a second surface opposite to the first surface that are parallel to an opening plane of the opening in the main body.

According to the present invention, an image pickup operation is not disturbed irrespective of an image pickup posture and generation of image blur is reduced.

Further features of the present invention will become apparent from the following description of exemplary embodiments with reference to the attached drawings.

DESCRIPTION OF THE EMBODIMENTS

Figure 1A:
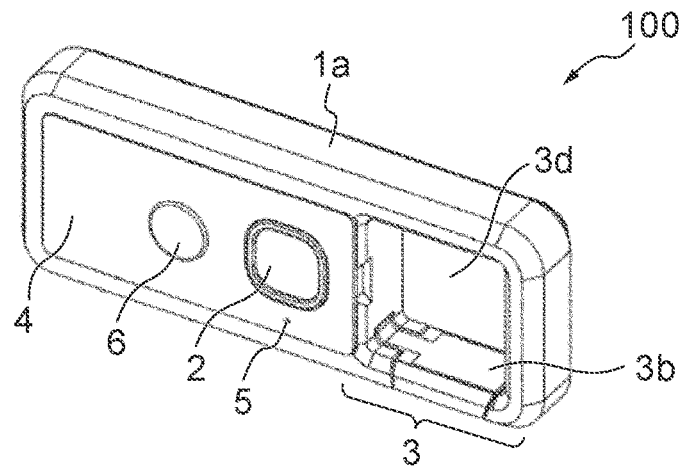
FIG. 1A and FIG. 1B are external perspective views showing a digital camera concerning a first embodiment.

Hereafter, embodiments according to the present invention will be described in detail by referring to the drawings.

Figure 1B:
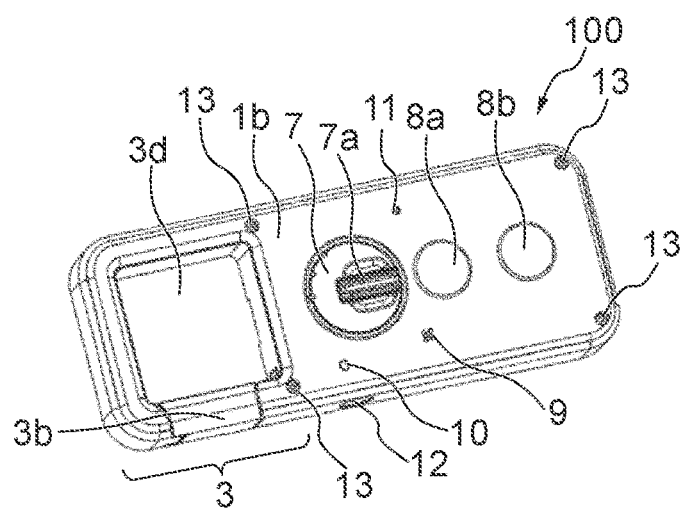

FIG. 1A is an external perspective view showing a digital camera 100 as an example of an image pickup apparatus concerning a first embodiment viewed from a front side (an object side). FIG. 1B is an external perspective view showing the digital camera 100 viewed from a rear side. In an optical axis direction, the object side is referred to as a front side and the side opposite to the object side is referred to as the rear side also in the following description.

The digital camera 100 has a front cover 1a and a rear cover 1b. The rear cover 1b is concluded and fixed to the front cover 1a with screws 13. In this way, the front cover 1a and the rear cover 1b that are concluded form the exterior of the digital camera 100. A tripod hole 12 is formed in one side surface of the digital camera 100.

In the front surface of the front cover 1a (front surface of the digital camera 100), a dress-up panel 4 is detachably attached. Details of the dress-up panel 4 will be mentioned later. Moreover, an image pickup lens 2, a selfie release button 6, and a microphone hole 5 are provided in the front surface of the front cover 1a.

The image pickup lens 2 takes in light from an object with a predetermined field angle, and forms an object image on an internal image sensor. The microphone hole 5 is a sound collection means used in order to take in sound from the outside at a time of video recording. A user is able to input an instruction to pick up an image of the user oneself into a control circuit (not shown) by pressing the selfie release button 6 while directing the image pickup lens 2 to oneself (one's face etc.).

A mode switching dial 7, a still-image-pickup release button 8a, a video recording start button 8b, a loudspeaker hole 9, an LED window 10, and a reset button 11 are provided in the rear cover 1b.

The mode switching dial 7 is an operation member for switching an image pickup mode between a video recording mode, a still-image pickup mode, or the like, and for turning off the power of the digital camera 100. The function of the mode switching dial 7 may be achieved by an operation member like a button. The user is able to input a pickup instruction of a static image into the control circuit by pressing the still-image-pickup release button 8a. Moreover, the user is able to input a start/termination instruction of the video recording into the control circuit by pressing the video recording start button 8b. The LED window 10 is provided to notify a user of a charge state, a connectable state with an external device, etc. by combinations of luminescent colors and luminescent states of an LED (not shown). An operation sound etc. are emitted from the loudspeaker hole 9. The reset button 11 is an operation member used to restore various settings of the digital camera 100 to settings at the time of factory shipments.

Figure 2A:
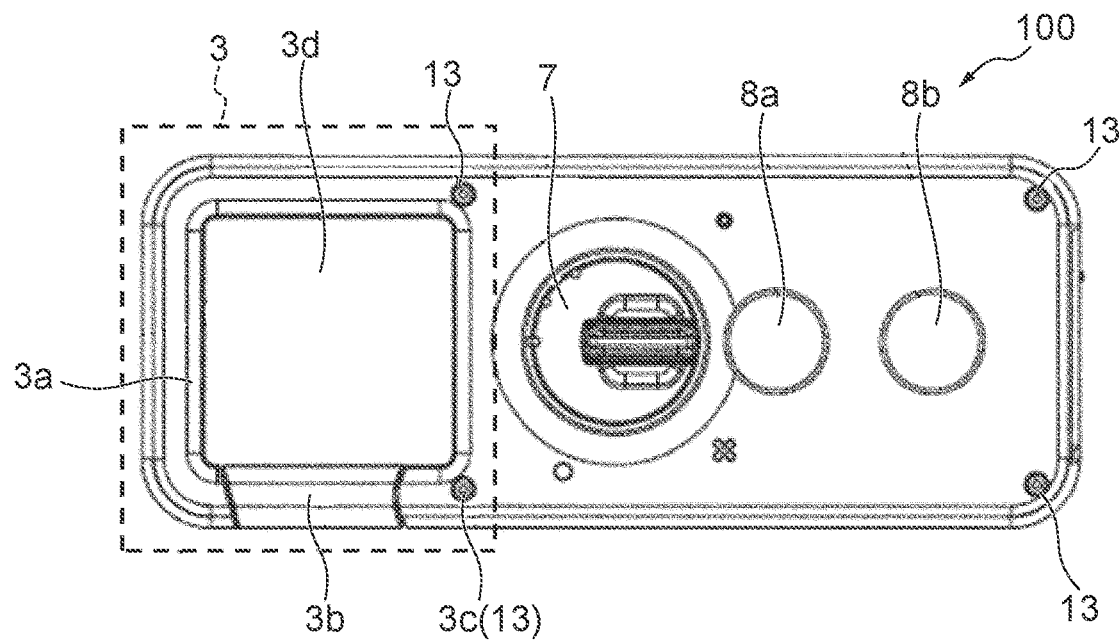
FIG. 2A and FIG. 2B are rear views describing an operation of a carabiner part of the digital camera of FIG. 1A.
Figure 2B:
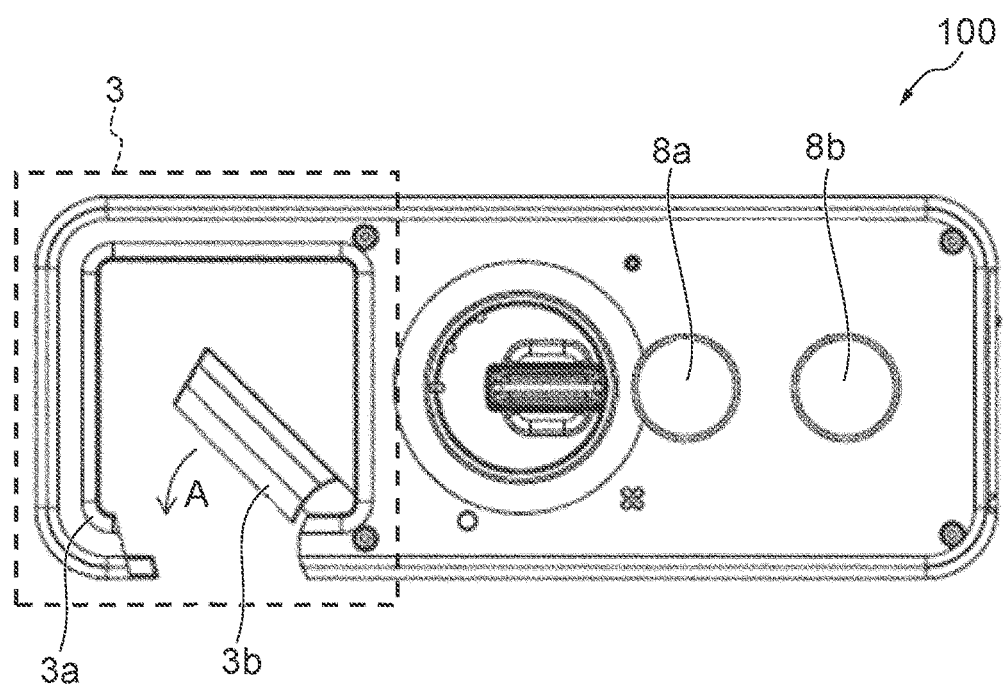

The digital camera 100 has a carabiner part (frame part) 3. FIG. 2A is a rear view showing the digital camera 100 of which the carabiner part 3 is in a closed state. FIG. 2B is a rear view showing the digital camera 100 of which the carabiner part 3 is in an opened state. The carabiner part 3 is indicated by a broken line frame in FIG. 2A and FIG. 2B.

The carabiner part 3 has a fixed body 3a and a movable body 3b that form an approximately rectangular opening 3d. The movable body 3b is an opening/closing member in the carabiner part 3, is supported by a rotation shaft 3c, and can rotate by a predetermined angle around the rotation shaft 3c so that an opened state will be achieved as shown in FIG. 2B. It should be noted that the rotation shaft 3c doubles as a screw 13, and is also a fastening member that fixes the front cover 1a and the rear cover 1b. The movable body 3b always receives energization force in a direction of an arrow A (direction toward the closed state) from a spring member (not shown). The position of the movable body 3b in the closed state is regulated by contacting the fixed body 3a. The user moves the movable body 3b to the opened state from the closed state by pushing up the movable body 3b in a direction inverse to the direction of the arrow A by applying force larger than the energization force that the movable body 3b receives from the spring member (not shown).

The carabiner part 3 functions as a carabiner because it can move between the opened state and the closed state. Although the carabiner part 3 is described like an independent part in the description for convenience of description, the fixed body 3a of the carabiner part 3 of the digital camera 100 consists of a part of the front cover 1a and a part of the rear cover 1b, and the carabiner part 3 forms a part of the exterior of the digital camera 100. That is, it can be said that the digital camera 100 itself has a carabiner structure. It should be noted that the carabiner part 3 and a main body (a part that is defined by excluding the part within the broken line frame from the digital camera 100 shown in FIG. 2A and FIG. 2B) of the digital camera 100 are not necessarily constructed integrally. For example, when the carabiner part 3 within the broken line frame in FIG. 2A and FIG. 2B is prepared as a separate member from the main body of the digital camera 100, the digital camera 100 can be constituted by combining the carabiner part 3 and the main body with screws etc.

Figure 3A:
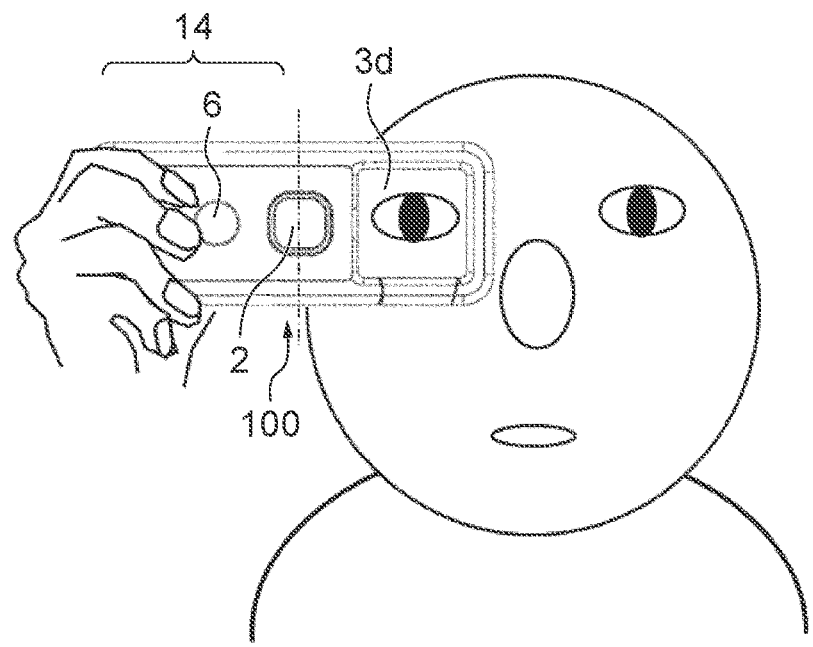
FIG. 3A and FIG. 3B are views describing situations where the digital camera of FIG. 1A is used in a horizontal posture.
Figure 3B:
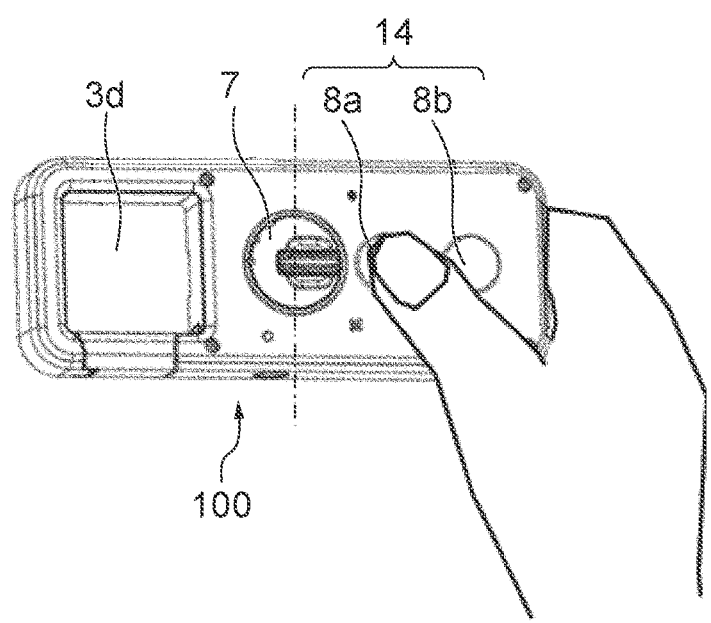
Figure 4A:
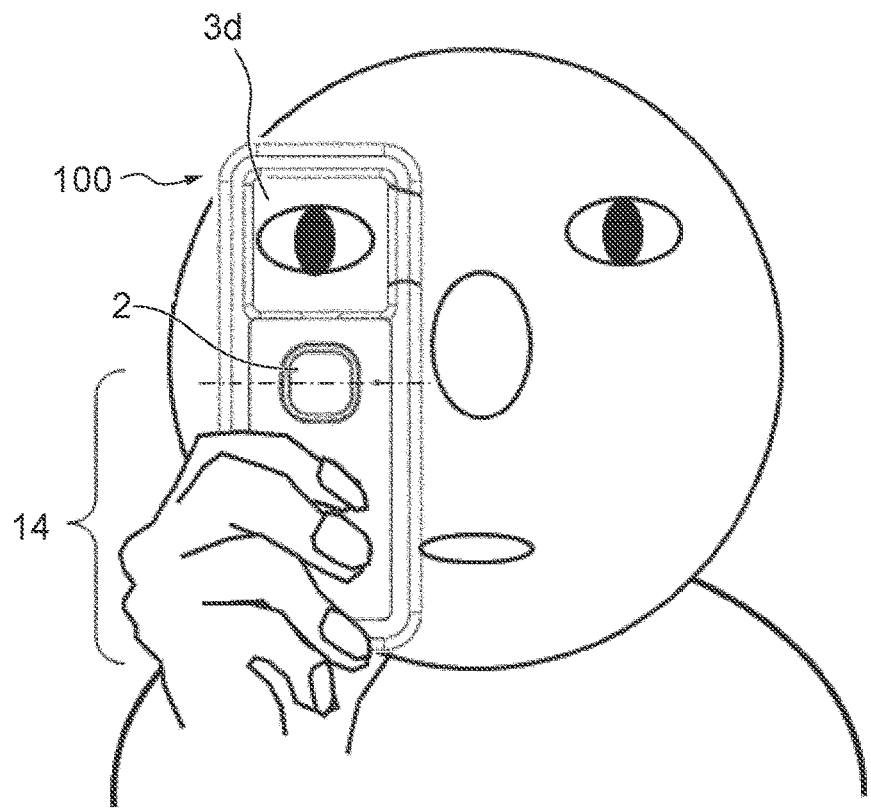
FIG. 4A and FIG. 4B are views describing situations where the digital camera of FIG. 1A is used in a vertical posture.
Figure 4B:
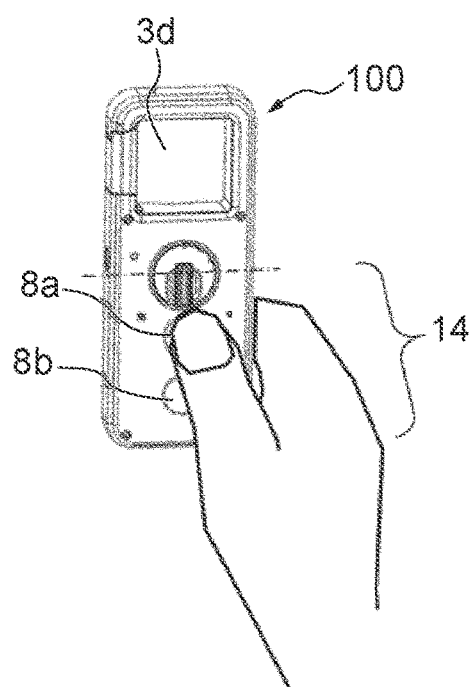

The carabiner part 3 having a frame shape functions as a transparent finder that is penetrated so as to connect the front surface (surface of the object side) of the digital camera and the rear surface (surface opposite to the object side). FIG. 3A is a view that shows a situation where the digital camera 100 is used in a horizontal posture and is viewed from the front side of the digital camera 100. FIG. 3B is a view that shows a situation where the digital camera 100 is held at a time of using the digital camera 100 in the horizontal posture and is viewed from the rear side of the digital camera 100. FIG. 4A is a view that shows a situation where the digital camera 100 is used in a vertical posture and is viewed from the front side of the digital camera 100. FIG. 4B is a view that shows a situation where the digital camera 100 is held at a time of using the digital camera 100 in the vertical posture and is viewed from the rear side of the digital camera 100.

When picking up an image with the digital camera 100, the user is able to check an image pickup area by holding and directing the digital camera 100 towards an object and by visually recognizing the object through the opening 3d of the carabiner part 3 that functions as the finder frame. The opening 3d has a rectangular shape (including a rectangle of which corners are rounded) in order to check verticality and horizontality of composition easily when a user checks an object through the opening 3d.

Figure 5A:
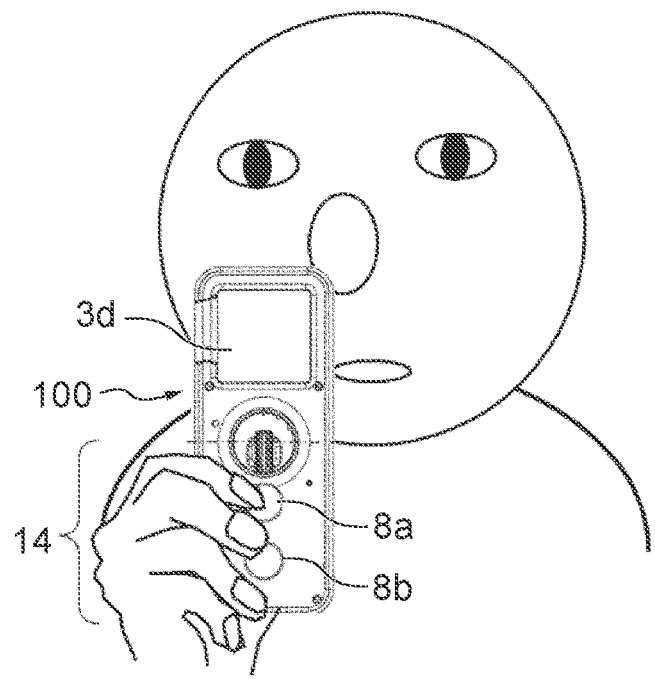
FIG. 5A and FIG. 5B are views describing situations where the digital camera of FIG. 1A is used for taking a selfie.
Figure 5B:
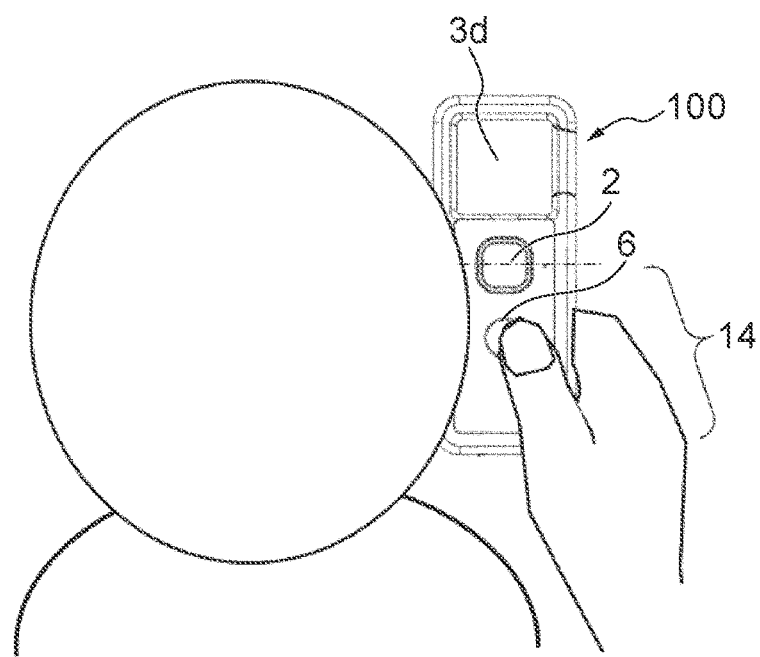

FIG. 5A is a view that shows a using situation of the digital camera 100 in a selfie posture and is viewed from the rear side of the digital camera 100. FIG. 5B is a view that shows a using situation of the digital camera 100 in the selfie posture and is viewed from the front side of the digital camera 100. When taking a selfie with the digital camera 100, the user should hold the digital camera 100 by directing the image pickup lens 2 to the user's face while keeping a certain distance between the digital camera 100 and the user's face.

Next, relations between the carabiner part 3 and other members, in particular, relations between the carabiner part 3 and the operating members that give great influence on the operability at a time of image pickup will be described. As shown in FIG. 1A, the image pickup lens 2 and the finder (opening 3d) are preferably arranged as close as possible. This reduces parallax between the image pickup lens 2 and the finder at a time of short-distance image pickup.

Since the carabiner part 3 functions as a finder frame and has the movable body 3b, a grip 14 that a user holds in the digital camera 100 is preferably provided in an area that is opposite to the carabiner part 3 beyond the image pickup lens 2 as shown in FIG. 3A through FIG. 5B. Thereby, since the user is able to hold the grip 14 firmly without putting a finger on the finder frame and the image pickup lens 2, a camera shake (image blur) at the time of the image pickup is reducible.

The selfie release button 6 is arranged on a first surface (front surface at the object side) that is parallel to an opening plane of the opening 3d of the carabiner part 3 in the digital camera 100. The still-image-pickup release button 8a and the video recording start button 8b are arranged on a second surface (rear surface) opposite to the first surface. Moreover, operation directions of these buttons are parallel to a direction that intersects perpendicularly with the opening plane of the opening 3d. Thereby, an image pickup operation is possible by holding the grip 14 while reducing the camera shake even in any of the image pickup postures of FIG. 3A through FIG. 5B. Particularly, the image pickup operation is possible while holding the grip 14 firmly even in the vertical posture (FIG. 4A and FIG. 4B) and the selfie posture (FIG. 5A and FIG. 5B) as with the operation in the horizontal posture (FIG. 3A and FIG. 3B).

At the time of image pickup, a finger should not cover the finder frame and the image pickup lens 2 so as not to disturb the image pickup operation. Accordingly, as shown in FIG. 1A and FIG. 1B, the still-image-pickup release button 8a, the video recording start button 8b, and the selfie release button 6 are preferably provided in the area that is opposite to the carabiner part 3 beyond the image pickup lens 2 as well as the grip 14. Although the digital camera 100 is configured by assuming that a user performs the image pickup operation using a right hand only, it can be configured by assuming that a user performs the image pickup operation using a left hand only. In such a case, a digital camera will be configured by minor-inverting the configuration shown in FIG. 1A and FIG. 1B.

The size of the opening 3*d* of the carabiner part 3 is preferably designed so as to enable attachment and detachment to a belt, such as a belt loop of trousers of a user and a belt of a rucksack. In the meantime, if the opening 3*d* is too large, the portability is spoiled and difference between an image pickup area checked through the finder frame and an actual image pickup area becomes large. In order to avoid such a problem, the maximum width of the opening 3*d* of the digital camera 100 preferably falls within a range of 20 mm through 50 mm when taking attachment/detachment property and portability into consideration. Specifically, the maximum width of the opening 3*d* is equal to 30 mm in this embodiment.

Although the movable body 3*b* of the carabiner part 3 of the digital camera 100 is provided in the same side as the tripod hole 12 as shown in FIG. 1B, the movable body 3*b* may be provided in one of the other two sides of the fixed body 3*a*. Moreover, the external appearance of the digital camera 100 is covered with the front cover 1*a* and rear cover 1*b* that are made from elastomer like rubber. Accordingly, the digital camera is covered by the elastomer components except for the image pickup lens 2, dress-up panel 4, still-image-pickup release button 8*a*, video recording start button 8*b*, selfie release button 6, mode switching dial 7, reset button 11, LED window 10, and screws 13. Accordingly, even if a user drops the digital camera 100 erroneously, occurrence of a defect (failure) of image pickup can be reduced because impacts on an internal image sensor and electronic parts can be softened. Moreover, the elasticity and high grip performance of the elastomer components effectively reduce prospect of unintentional slipping and dropping from a hand even when a user holds the digital camera 100 by the single hand.

Figure 6A:
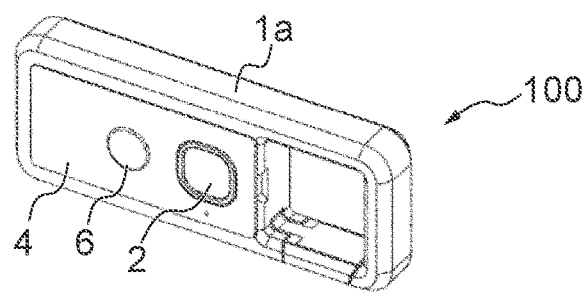
FIG. 6A through FIG. 6D are views describing a dress-up panel of the digital camera of FIG. 1A.
Figure 6B:
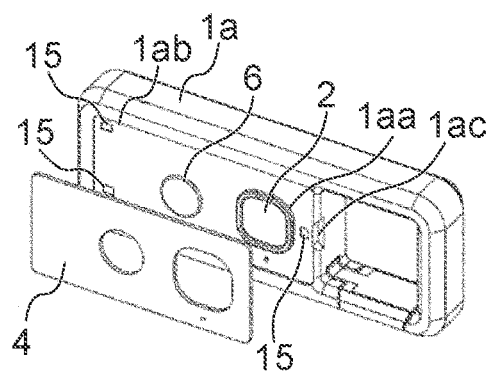

Next, the dress-up panel 4 will be described. FIG. 6A is a perspective view showing the digital camera 100 in the state where the dress-up panel 4 is attached to the front cover 1*a*. FIG. 6B is a perspective view showing the digital camera 100 in the state where the dress-up panel 4 is detached from the front cover 1*a*.

The dress-up panel 4 consists of an appearance layer, a steel plate layer that sticks to magnets 15 arranged at the front cover 1*a*, and a double-stick tape layer that bonds them mutually. The appearance layer is formed by applying surface treatment, such as printing of designed pattern, to a sheet member made from polycarbonate. It should be noted that the dress-up panel 4 is provided with openings for exposing the image pickup lens 2 and the selfie release button 6 to the external appearance.

There is a demand to change the appearance of the digital camera 100 depending on a scene or a situation in which the digital camera 100 is used. Accordingly, the dress-up panel 4 is preferably designed so that a user can easily replace it on the assumption that two or more sorts of dress-up panels 4 that have various appearance members 4*a* will be provided.

In this embodiment, when the dress-up panel 4 is attached, the dress-up panel 4 is positioned by a convex part 1*aa* that constitutes the outer circumference of the image pickup lens 2 and a standing wall 1*ab* to which a contour part of the dress-up panel 4 can be fitted. And the dress-up panel 4 is held with the three magnets 15 fixed to the front cover 1*a*. It should be noted that the fixing mechanism is not limited to the configuration that can fix the dress-up panel 4 using the magnets 15. For example, when image pickup at underwater or a waterside is not taken into consideration, a configuration that does not use the magnets 15 may be employed. In that case, the dress-up panel 4 is configured by using the double-stick tape layer of which the side of the appearance layer has high adhesiveness and the side of the front cover 1*a* has low adhesiveness. In this case, the rear surface of the dress-up panel 4 is a low adhesiveness surface in the state where the dress-up panel 4 is detached. On the contrary, the front surface of the front cover 1*a* may have low adhesiveness. In this case, the dress-up panel 4 will consist of only the appearance layer.

The dress-up panel 4 can be detached when a user hangs a finger (claw) on a concave part 1*ac* provided in the side surface (a standing wall that forms the finder frame in the front cover 1*a*) at the side of the carabiner part 3 of the front cover 1*a*. The user can detach the dress-up panel 4 from the front cover 1*a* easily by raising the portion that faces the concave part 1*ac* in the dress-up panel 4 with the finger (claw).

Figure 6C:
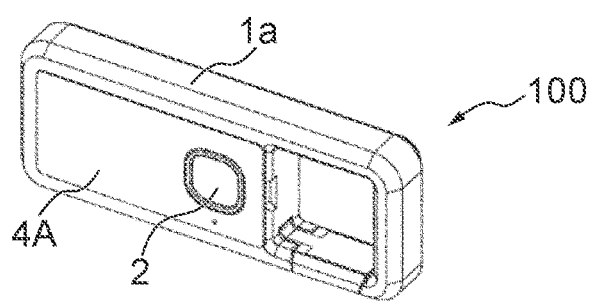
Figure 6D:
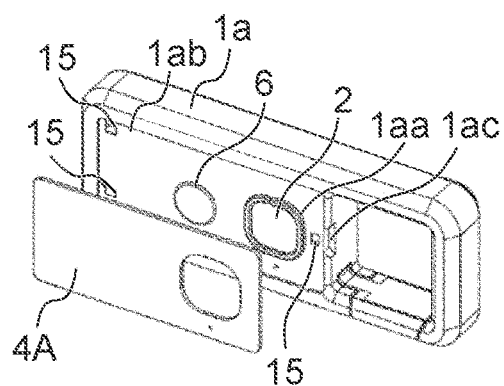

FIG. 6C is a perspective view showing the digital camera 100 in a state where a dress-up panel 4A that is a modified example of the dress-up panel 4 is attached. FIG. 6D is a perspective view showing the digital camera 100 in a state where the dress-up panel 4A has been detached from the front cover 1*a*. The dress-up panel 4A does not have an opening corresponding to the selfie release button 6. Accordingly, an operation mistake like erroneous pressing of the selfie release button 6 can be prevented by equipping with the dress-up panel 4A. When detaching the dress-up panel 4A, a user is able to operate the selfie release button 6 for the selfie.

As mentioned above, the user is able to hold the digital camera of the first embodiment stably irrespective of the image pickup posture. Moreover, the image pickup operation is not disturbed in the state where the digital camera is held, which enables stable image pickup while reducing the image blur.

Figure 7:
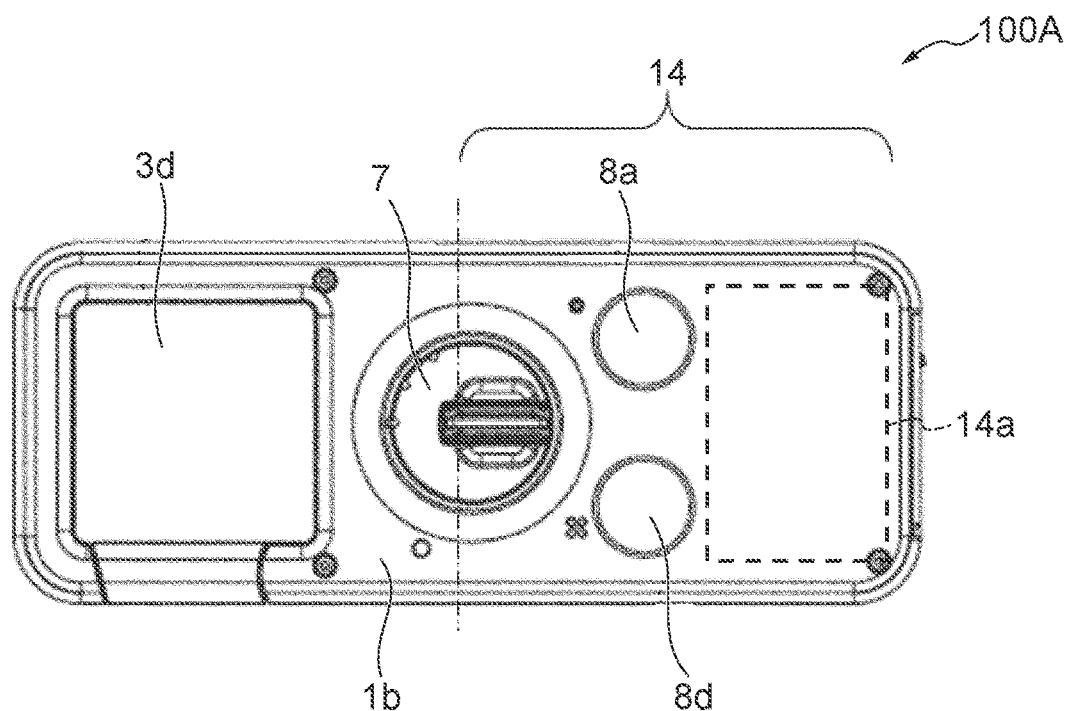
FIG. 7 is a rear view showing a digital camera concerning a second embodiment.

Next, a second embodiment will be described. FIG. 7 is a rear view showing a digital camera 100A concerning the second embodiment. The digital camera 100A differs from the digital camera 100 concerning the first embodiment in the positions of the still-image-pickup release button 8*a* and video recording start button 8*b* that are arranged on the rear cover 1*b*. In the digital camera 100A, the still-image-pickup release button 8*a* and the video recording start button 8*b* are arranged side by side in the width direction that is perpendicular to the longitudinal direction of the rear cover 1*b*. This enlarges an area 14*a* in which an operating member is not arranged in the grip 14, which improves a grip performance and reduces an operation mistake.

Since the other components of the digital camera 100A are identical to that of the digital camera 100 concerning the first embodiment, their descriptions are omitted. The digital camera 100A is able to obtain the same effects that the digital camera 100 obtains.

Figure 8A:
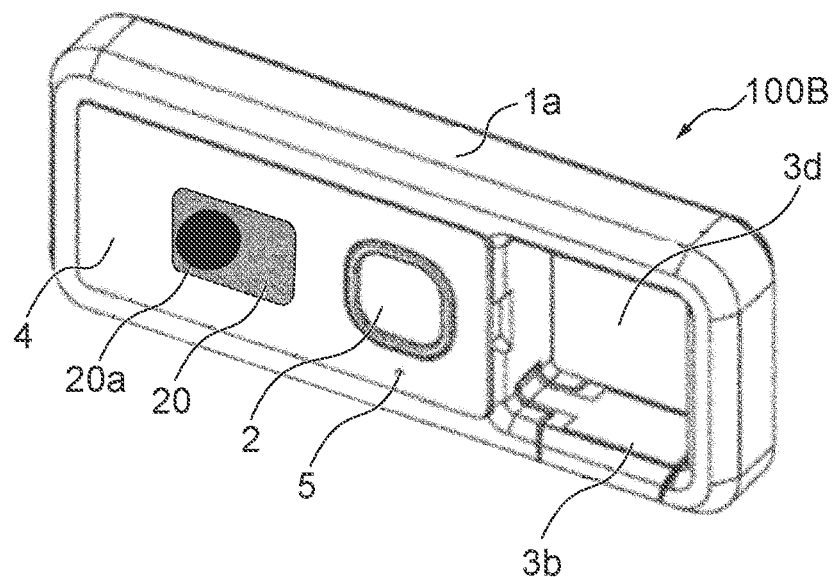
FIG. 8A and FIG. 8B are external perspective views showing a digital camera concerning a third embodiment.
Figure 8B:
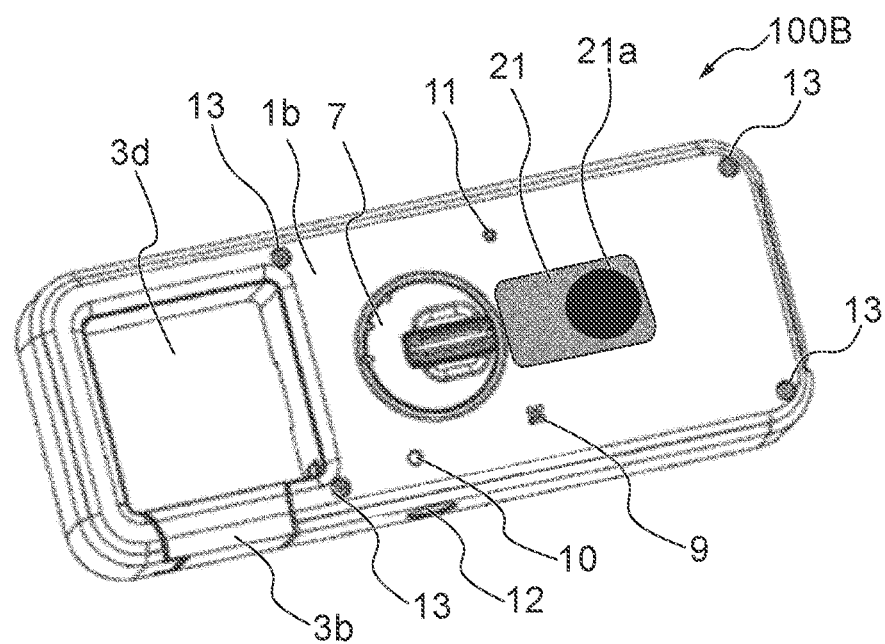

Next, a third embodiment will be described. FIG. 8A is an external perspective view showing a digital camera 100B concerning the third embodiment viewed from the front side. FIG. 8B is an external perspective view showing the digital camera 100B viewed from the rear side. Moreover, the same reference numerals are applied to components of the digital camera 100B identical to the components of the digital camera 100 concerning the first embodiment and duplicated descriptions are omitted in the following description.

The digital camera 100B is not provided with the selfie release button 6, still-image-pickup release button 8a, and video recording start button 8b that the digital camera 100 has. Instead, the digital camera 100B is provided with a slide-type selfie release button 20 and a slide-type still-image-pickup release button 21.

Figure 9A:
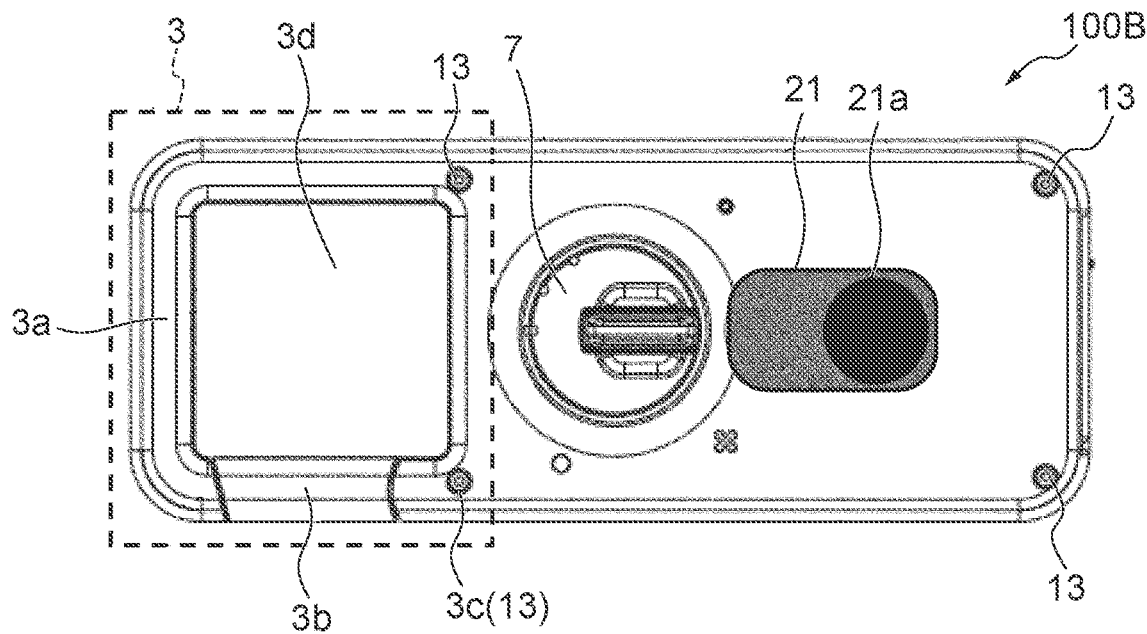
FIG. 9A and FIG. 9B are rear views describing an operation of a carabiner part of the digital camera of FIG. 8A.
Figure 9B:
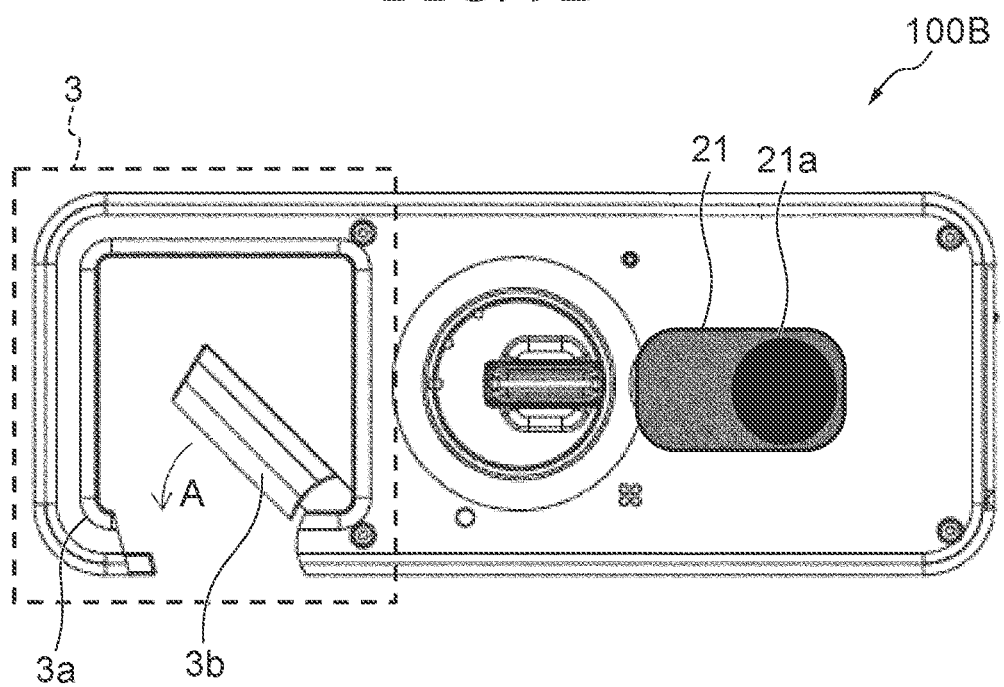

The digital camera 100B has the carabiner part 3. FIG. 9A is a rear view showing the digital camera 100B of which the carabiner part 3 is in a closed state. FIG. 9B is a rear view showing the digital camera 100B of which the carabiner part 3 is in an opened state. Since the configuration and operation method of the carabiner part 3 are the same as that of the carabiner part 3 of the digital camera 100 concerning the first embodiment, their descriptions are omitted here. Moreover, since a preferable shape of the carabiner part 3 conforms to the preferable shape of the carabiner part 3 of the digital camera 100 concerning the first embodiment, its description is omitted here.

The digital camera 100B has the front cover 1a and rear cover 1b that are fastened with the screws 13. The front cover 1a and rear cover 1b are made from elastomer as with the digital camera 100 concerning the first embodiment. Accordingly, since the fact that the front cover 1a and rear cover 1b have excellent grip performance and impact resistance is the same as the first embodiment, its description is omitted here.

The image pickup lens 2, dress-up panel 4, and microphone hole 5 are provided in the front cover 1a. The mode switching dial 7, loudspeaker hole 9, LED window 10, and reset button 11 are provided in the rear cover 1b. The tripod hole 12 is formed in one side surface of the digital camera 100B. Since these components are the same as that of the digital camera 100 of the first embodiment, their descriptions are omitted here.

The slide-type selfie release button 20 is arranged on the front cover 1a at the front side of the digital camera 100B. When a user slides a slide part 20a of the selfie release button 20 with a thumb while directing the image pickup lens 2 to one's face, the user is able to capture an image by entering a pickup instruction to a control circuit (not shown).

The still-image-pickup release button 21 is arranged on the rear cover 1b at the rear side of the digital camera 100B. When the user slides a slide part 21a of the still-image-pickup release button 20 with the thumb, the user is able to capture an image by entering a pickup instruction to the control circuit (not shown).

Figure 10A:
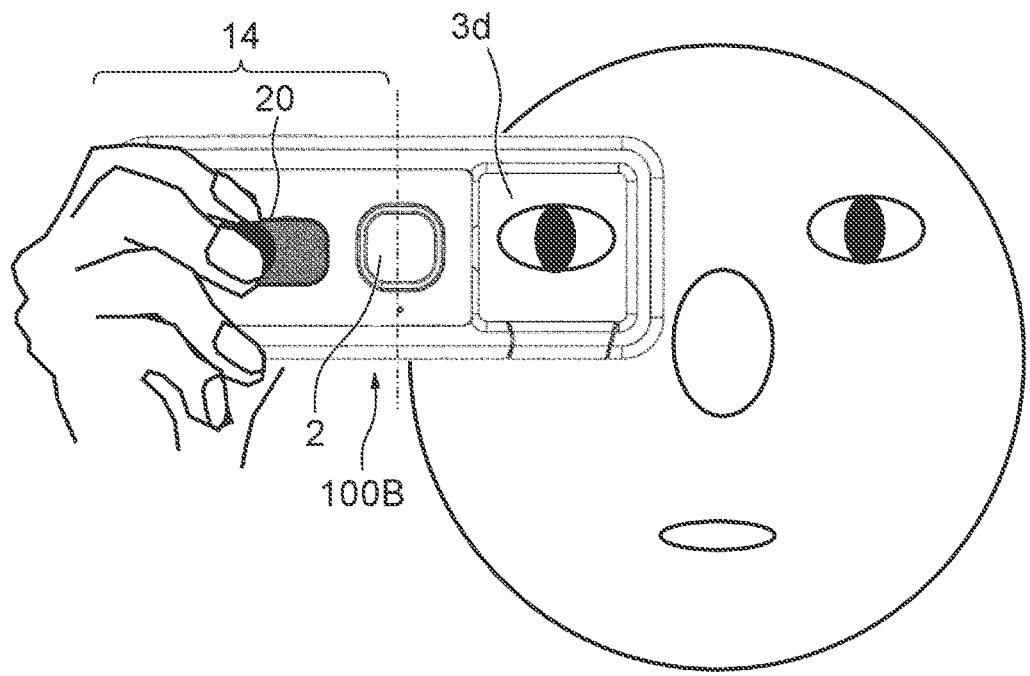
FIG. 10A and FIG. 10B are views describing situations where the digital camera of FIG. 8A is used in a horizontal posture.
Figure 10B:
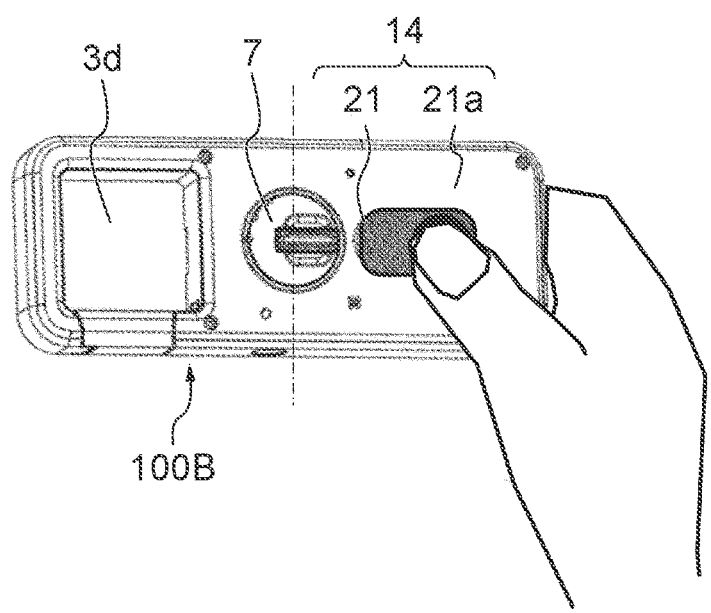
Figure 11A:
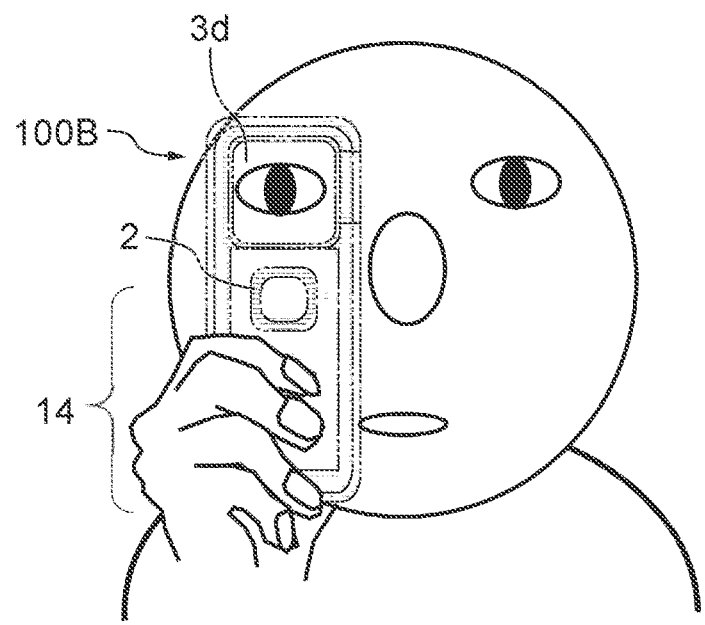
FIG. 11A and FIG. 11B are views describing situations where the digital camera of FIG. 8A is used in a vertical posture.
Figure 11B:
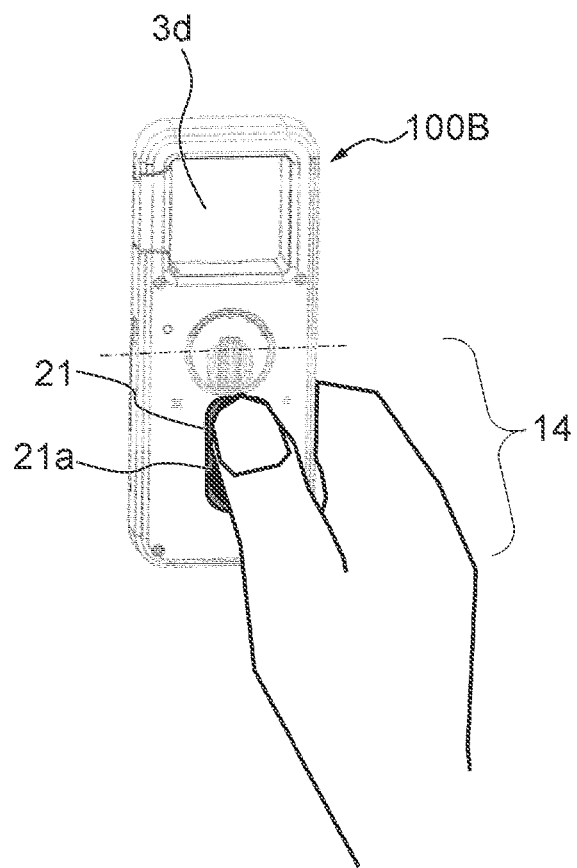
Figure 12A:
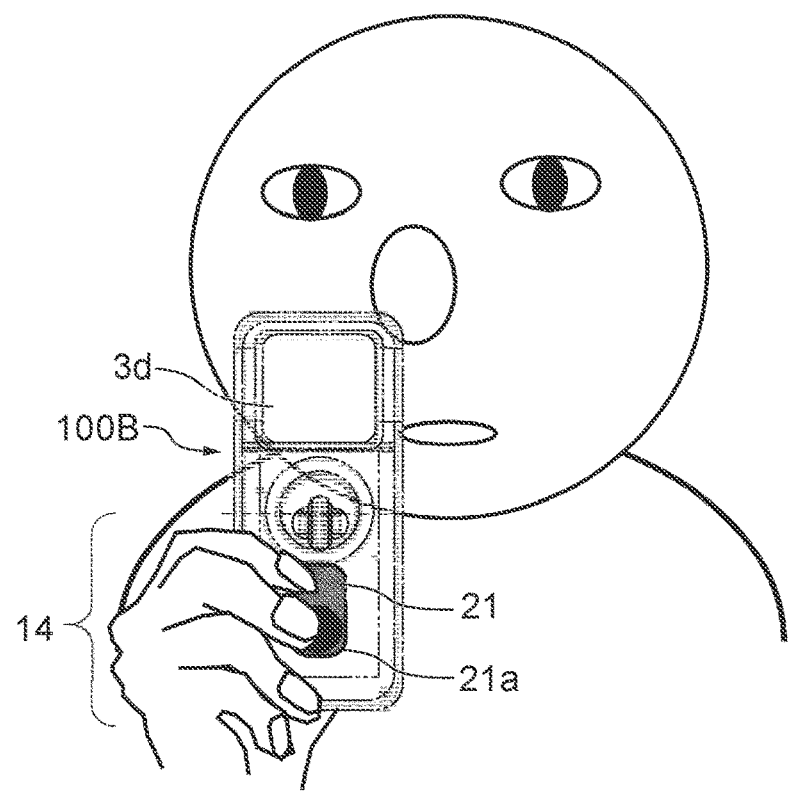
FIG. 12A and FIG. 12B are views describing situations where the digital camera of FIG. 8A is used for taking a selfie.
Figure 12B:
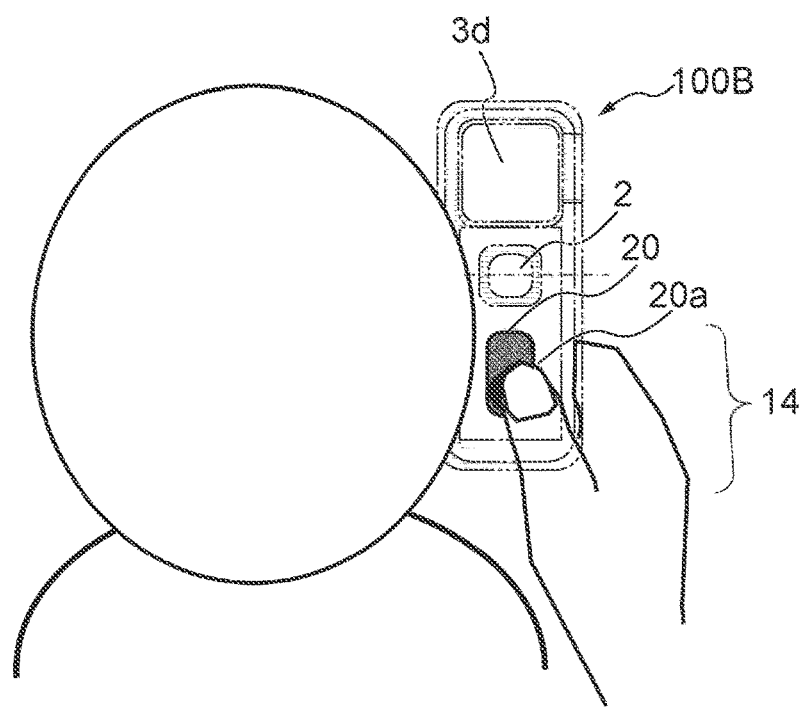

FIG. 10A is a view that shows a situation where the digital camera 100B is used in the horizontal posture and is viewed from the front side of the digital camera 100B. FIG. 10B is a view that shows a situation where the digital camera 100B is held at a time of using the digital camera 100B in the horizontal posture and is viewed from the rear side of the digital camera 100B. FIG. 11A is a view that shows a situation where the digital camera 100B is used in the vertical posture and is viewed from the front side of the digital camera 100B. FIG. 11B is a view that shows a situation where the digital camera 100B is held at a time of using the digital camera 100B in the vertical posture and is viewed from the rear side of the digital camera 100B. FIG. 12A is a view that shows a using situation of the digital camera 100B in the selfie posture and is viewed from the rear side of the digital camera 100B. FIG. 12B is a view that shows a using situation of the digital camera 100B in the selfie posture and is viewed from the front side of the digital camera 100B.

Since the finder function of the frame-shaped carabiner part 3 is the same as the finder function of the digital camera 100 concerning the first embodiment, its detailed description is omitted here.

Next, relations between the carabiner part 3 and other members, in particular, relations between the carabiner part 3 and the operating members that give great influence on the operability at a time of image pickup will be described. As shown in FIG. 8A, the image pickup lens 2 and the finder (opening 3d) are preferably arranged as close as possible. This reduces parallax between the image pickup lens 2 and the finder at a time of short-distance image pickup.

Since the carabiner part 3 functions as a finder frame and has the movable body 3b, the grip 14 that a user holds in the digital camera 100B is preferably provided in an area that is opposite to the carabiner part 3 beyond the image pickup lens 2 as shown in FIG. 10A through FIG. 12B. Thereby, since the user is able to hold the grip 14 firmly without putting a finger on the finder frame and the image pickup lens 2, a camera shake (image blur) at the time of the image pickup is reducible.

The still-image-pickup release button 21 and the selfie release button 20 are arranged on the surface of the digital camera 100B that is parallel to the opening plane of the opening 3d of the carabiner part 3. Thereby, an image pickup operation is possible by holding the grip 14 while reducing the camera shake even in any of the image pickup postures of FIG. 10A through FIG. 12B. Particularly, the image pickup operation is possible while holding the grip 14 firmly even in the vertical posture (FIG. 11A and FIG. 11B) and the selfie posture (FIG. 12A and FIG. 12B) as with the operation in the horizontal posture.

The still-image-pickup release button 21 and the selfie release button 20 are arranged in the area that is opposite to the carabiner part 3 beyond the image pickup lens 2 as well as the grip 14. Thereby, the finger does not cover the finder frame and the image pickup lens 2 even in any of the image pickup postures of FIG. 10A through FIG. 12B.

When taking a selfie, the user is touching the still-image-pickup release button 21 arranged at the rear side of the digital camera 100B in order to hold the grip 14 as shown in FIG. 12A. The still-image-pickup release button 21 is not used in selfie. Since the user's finger is touching the still-image-pickup release button 21 while applying force in the direction opposite to the slide operation, the operation mistake of the still-image-pickup release button 21 is prevented.

Although the digital camera 100B is configured by assuming that a user performs the image pickup operation using a right hand only, it can be configured by assuming that a user performs the image pickup operation using a left hand only. In such a case, a digital camera will be configured by mirror-inverting the configuration shown in FIG. 10A through FIG. 12B.

As mentioned above, the user is able to hold the digital camera of the third embodiment stably irrespective of the image pickup posture. Moreover, the image pickup operation is not disturbed in the state where the digital camera is held, which enables stable image pickup while reducing the image blur.

Figure 13A:
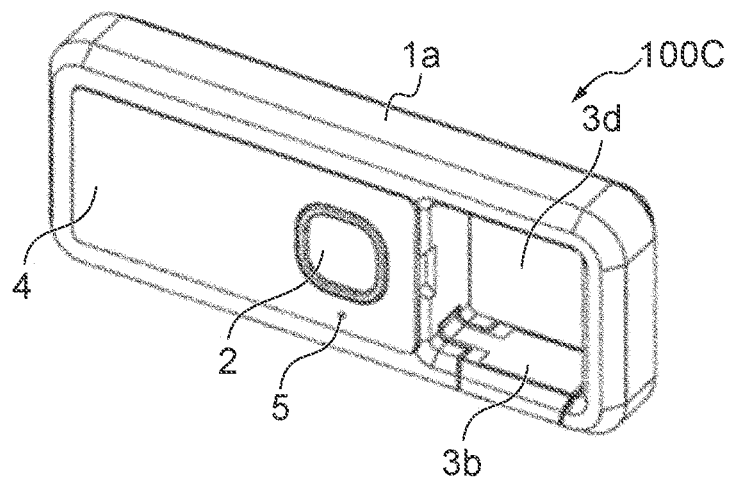
FIG. 13A and FIG. 13B are external perspective views showing a digital camera concerning a fourth embodiment.
Figure 13B:
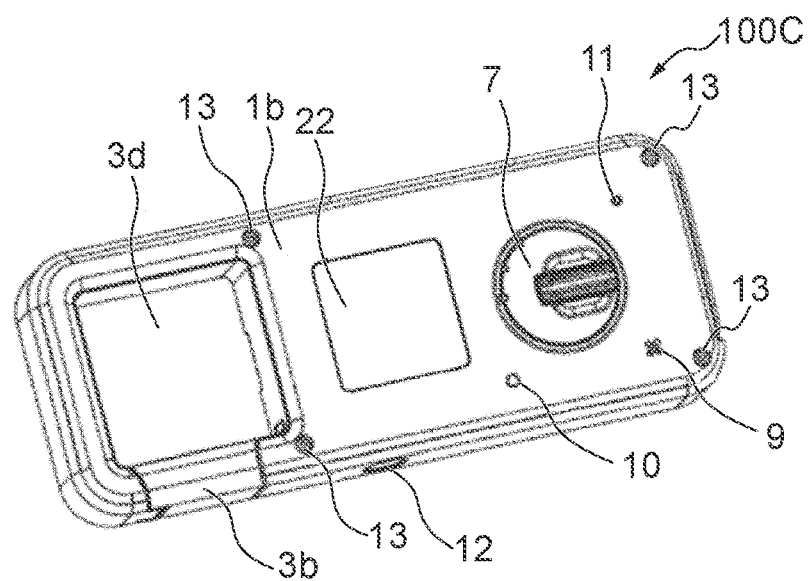

Next, a fourth embodiment will be described. FIG. 13A is an external perspective view showing a digital camera 100C concerning the fourth embodiment viewed from the front side. FIG. 13B is an external perspective view showing the digital camera 100C viewed from the rear side.

The digital camera 100C is different from the digital camera 100B concerning the third embodiment in that the digital camera 100C is not provided with the selfie release button 20 including the slide part 20a and the still-image-pickup release button 21 including the slide part 21a but is provided with a capacitive touchpad 22. In connection with this, the position of the mode switching dial 7 in the rear surface of the digital camera 100C is different from that of the digital camera 100B. Since the other components of the digital camera 100C are identical to that of the digital camera 100B, their descriptions are omitted.

The capacitive touchpad 22 can detect a touch of a person's finger and functions as a still-image-pickup release button when detecting a touch of a person's finger. In a case where the capacitive touchpad 22 that has an area larger than a finger can be arranged, a function that changes an in-focus position of the image pickup lens 2 in response to a touched position may be given.

Figure 14A:
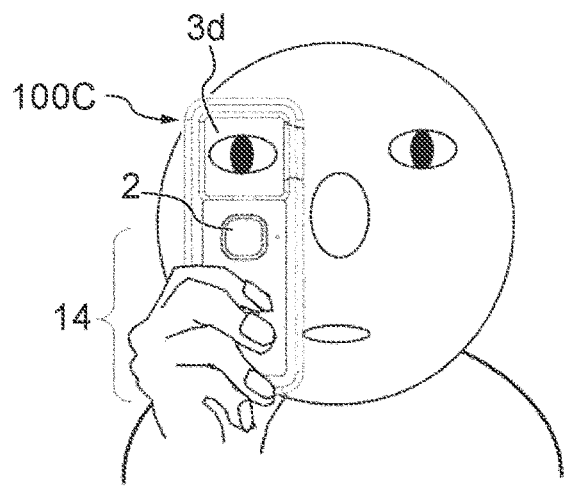
FIG. 14A, FIG. 14B, and FIG. 14C are views describing situations where the digital camera of FIG. 13A is used in a vertical posture.
Figure 14B:
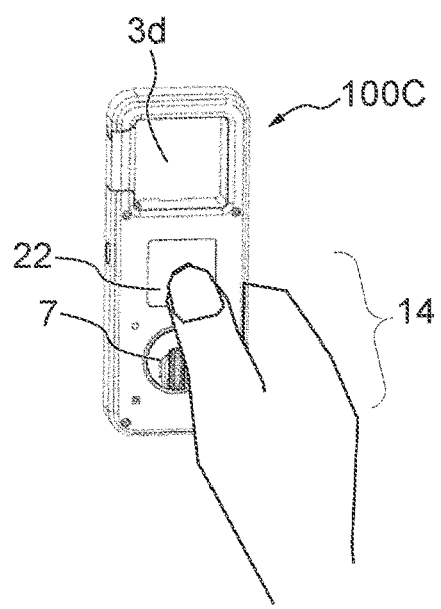

FIG. 14A is a view that shows a situation where the digital camera 100C is used in the vertical posture and is viewed from the front side of the digital camera 100C. FIG. 14B is a view that shows a situation where the digital camera 100C is held at a time of using the digital camera 100C in the vertical posture and is viewed from the rear side of the digital camera 100C. When holding the grip 14, a user is able to perform an image pickup operation without covering the image pickup lens 2 by an index finger.

Moreover, the user is able to touch the capacitive touchpad 22 with a thumb. Since large force is unnecessary for a touch operation of the thumb, the user is able to perform the release operation while reducing a camera shake even when the capacitive touchpad 22 is provided near the opening 3d. Furthermore, since the user is able to touch the capacitive touchpad 22 by stretching the thumb, the in-focus position of the image pickup lens 2 is finely designated in the case where the in-focus position can be changed in response to a touched position to the capacitive touchpad 22.

Figure 14C:
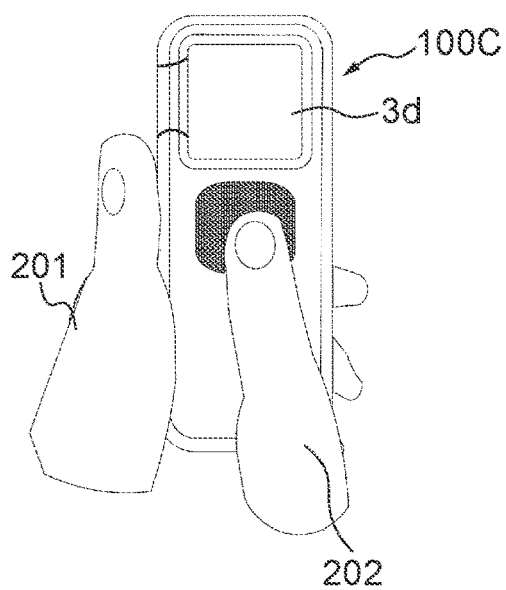

FIG. 14C is a view showing a situation where the user holds the digital camera 100C with the left hand and performs the release operation with the right hand. The user performs the release operation by a right index finger 202 in a state where the user puts a left thumb 201 on the side surface of the digital camera 100C and holds the digital camera 100C so as to enfold with the entire left hand without covering the image pickup lens 2. In this way, the user is able to quickly perform the release operation by the right index finger without putting force while holding the digital camera 1000 firmly with the left hand.

It should be noted that the user is able to hold the digital camera of the fourth embodiment stably. Moreover, the image pickup operation is not disturbed in the state where the digital camera is held, which enables stable image pickup while reducing the image blur.

Figure 15A:
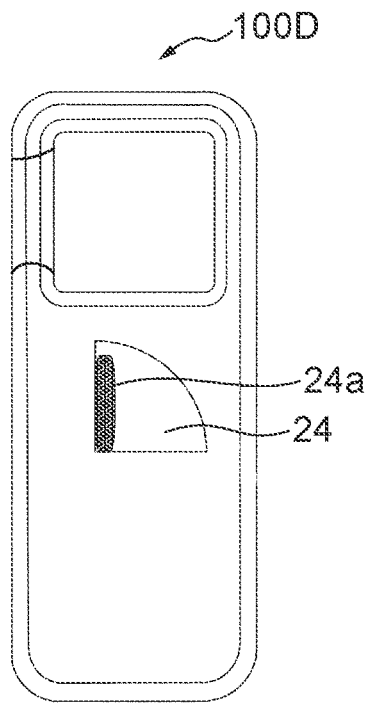
FIG. 15A and FIG. 15B are rear views showing a digital camera concerning a fifth embodiment.
Figure 15B:
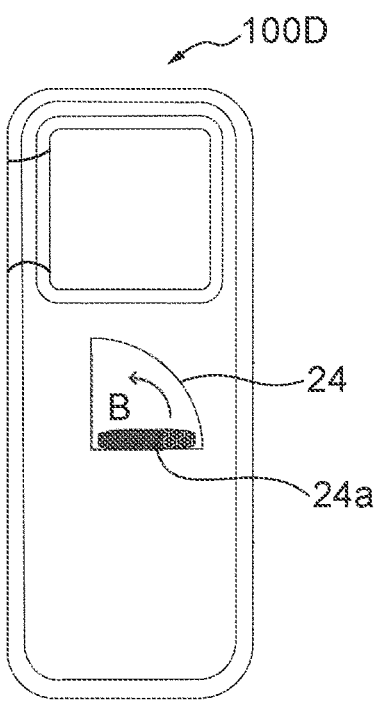

Next, a fifth embodiment will be described. FIG. 15A is a first view showing a digital camera 100D concerning the fifth embodiment viewed from the rear side. FIG. 15B is a second view showing the digital camera 100D viewed from the rear side. The digital camera 100D is different from the digital camera 100C concerning the fourth embodiment in that the digital camera 100D is not provided with the capacitive touchpad 22 but is provided with a lever type switch 24 instead. Since the other components of the digital camera 100D are identical to that of the digital camera 100C, their descriptions are omitted.

The lever type switch 24 has a lever 24a. The lever 24a is movable from a first position shown in FIG. 15A to a second position shown in FIG. 15B, when a user manually rotates the lever 24a around an axis parallel to a thickness direction of the digital camera 100D by 90 degrees in a clockwise direction. Moreover, when the lever 24a is moved to the second position, the lever 24a receives energization force that returns it to the first position as shown in a curvilinear arrow B from an elastic member (not shown) like a spring. Even if the user lifts the hand from the lever 24a in the second position, the lever 24a does not return to the first position promptly, but takes a certain period (for example, several seconds) to return to the first position. Accordingly, the digital camera 100D enables self-timer image pickup under a condition where the user puts the digital camera 100D and goes into an image pickup field and self-timer image pickup using a tripod for preventing a camera shake. In the meantime, the user is able to give a function of a regular release button to the lever 24a by moving the lever 24 to the first position compulsorily from the second position after rotating the lever 24a to the second position from the first position.

As mentioned above, the user is able to hold the digital camera of the fifth embodiment stably. Moreover, the image pickup operation is not disturbed in the state where the digital camera is held, which enables stable image pickup while reducing the image blur.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007682, filed Jan. 21, 2020, which is hereby incorporated by reference herein in its entirety.

What is claimed is:
1. An image pickup apparatus comprising:
a main body configured to have an image pickup lens and including a first surface at an object side of the image pickup apparatus and a second surface opposite to the first surface;
a frame part configured to form an opening together with a part of the main body and to have an opening/closing member that opens/closes the opening;
at least one operating member configured to enter a predetermined pickup instruction that causes the image pickup apparatus to capture one or more images and being arranged in at least one of the first surface at the object side and the second surface opposite to the first surface that are parallel to an opening plane of the opening,
wherein the image pickup lens is provided in the first surface, and
wherein the at least one operating member includes one or more operating members arranged in an area that is opposite to the opening beyond the image pickup lens in the first surface.

2. The image pickup apparatus according to claim 1, wherein the image pickup lens is provided in the first surface so as to be close to the opening.

3. The image pickup apparatus according to claim 1, wherein an operation direction of the at least one operating member is parallel to a direction that intersects perpendicularly with the opening plane.

4. The image pickup apparatus according to claim 3, wherein the at least one operating member includes a still-image-pickup release button and a video recording start button that are arranged side by side in a predetermined direction on the second surface.

5. The image pickup apparatus according to claim 1, wherein an operating direction of the at least one operating member is parallel to the opening plane.

6. The image pickup apparatus according to claim 5, wherein the operating direction of the at least one operating member is directed toward the opening.

7. The image pickup apparatus according to claim 5, wherein the at least one operating member is a slide type.

8. The image pickup apparatus according to claim 1, wherein the at least one operating member is a capacitive touchpad.

9. The image pickup apparatus according to claim 8, wherein the at least one operating member further includes one or more operating members arranged in the second surface.

10. The image pickup apparatus according to claim 1, wherein the at least one operating member is a lever-type operating member that is rotatable around an axis parallel to a direction that intersects perpendicularly with the opening plane.

11. The image pickup apparatus according to claim 10, wherein the at least one operating member is movable from a first position to a second position manually and takes a certain period to return to the first position from the second position.

12. The image pickup apparatus according to claim 10, wherein the at least one operating member further includes one or more operating members arranged in the second surface.

13. The image pickup apparatus according to claim 1, further comprising another operating member for performing various settings of the image pickup apparatus,
   wherein one or more operating members among the at least one operating member and the another operating member are provided in the second surface.

14. The image pickup apparatus according to claim 1, wherein the frame part has a carabiner structure.

* * * * *